March 6, 1951     L. C. MEAD     2,543,922
RELEASE MEANS FOR TOGGLE-ACTUATED PLIER-TYPE WRENCHES Filed Jan. 27, 1949

Inventor
Lawrence C. Mead

ATTORNEY

Patented Mar. 6, 1951

2,543,922

UNITED STATES PATENT OFFICE 2,543,922

RELEASE MEANS FOR TOGGLE-ACTUATED PLIER-TYPE WRENCHES

Lawrence C. Mead, Turlock, Calif.

Application January 27, 1949, Serial No. 73,047

5 Claims. (Cl. 81—84)

This invention relates to, and it is an object to provide, an easily and readily manipulated release for locking pliers wherein the jaws are locked in engagement with the work upon approaching movement of the handles sufficient to cause a toggle bar, in the tool, to pass dead-center and yieldably lock the handles against separation.

Another object of the invention is to provide a lock release means for the jaws which includes, with a sectional handle pivoted intermediate its ends, and a shiftable locking member mounted on the handle for selectively holding the sections against relative swinging movement; a means whereby the jaws may be released upon relative swinging of the handle sections in one direction.

Another object of the invention is to provide a release for locking pliers which can be operated in cramped quarters by swinging the ends of the handles closer together.

A further object of the invention is to provide an adjusting toggle bar, of one piece, for adjusting the pliers jaws and which is located in a convenient place for the fingers, and having a round fulcrum section forming a guide for centering the sectional handle.

A further object of the invention is to provide a practical device, and one which will be exceedingly effective for the purpose for which it is produced.

These objects are accomplished by means of such structure and relative arrangement of parts as will fully appear by perusal of the following specification and claims.

Figure 1:
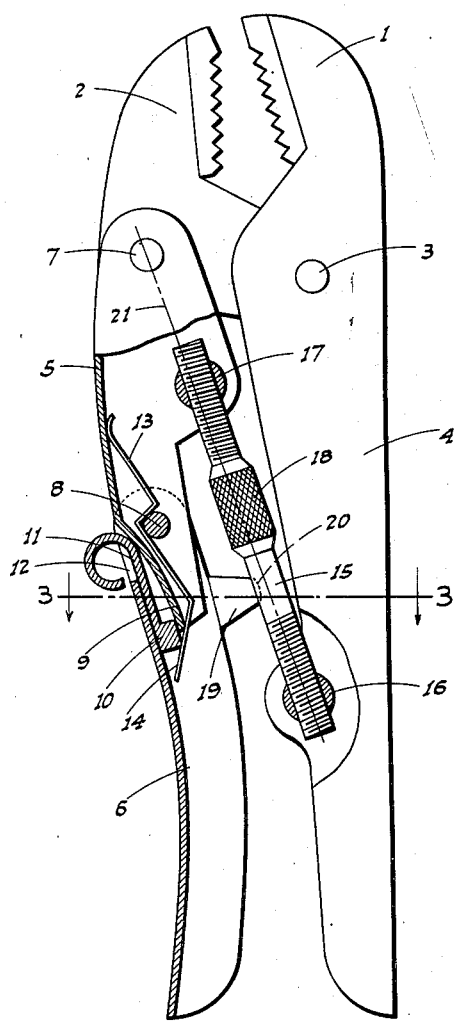
Figure 1 is a side elevation, partly broken out, showing the pliers in a locked position with the sectional handle locked rigidly.

Referring now more particularly to the characters of reference on the drawings, the release device is here shown as embodied in a pair of locking pliers which includes a fixed jaw 1 and a movable cooperative jaw 2 pivoted in connection therewith, as at 3.

The fixed jaw 1 is formed in integral rigid relation on the forward end of a handle 4, whereas the other handle 6 of the pliers has a forward section 5. The forward section 5 is pivoted to the movable jaw 2, as at 7, while the handle 6 is pivotally connected by a pivot 8 to the forward section 5. The handle sections are of channel form in section, in facing relation to handle 4, and the forward section 5 includes a shank 9 extending into the channel of handle 6 beyond pivot 8. A longitudinally slidable key block 10 of a width to fill the space between the shank 9 and the bottom of the channel of handle 6 is provided for releasably holding handle sections 5 and 6 in rigid relation. The block is provided with an extension 11 projecting through a slot 12 to the outside of handle 6 in the form of a finger element, so that the block may be slid back and forth. A leaf spring 13 is disposed in handle section 5 and shank 9 in engagement with pivot 8, and includes a free end portion 14 extending diagonally across the end of block 10 and tending to force the same between handle 6 and shank 9.

A rotary toggle bar 15 extends diagonally between handle 4 and forward handle portion 5, the end portions of the bar being oppositely threaded and passing through rotatable cross pins 16 and 17 in said handle 4 and handle portion 5, respectively. Intermediate its ends, the bar 15 is formed with an enlarged portion 18 which may be knurled for convenient rotation by the fingers.

Figure 3:
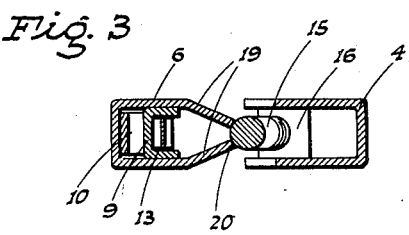
Figure 3 is a detailed sectional view taken on line 3—3 Figure 1.

A pair of legs 19 are formed with and project from the sides of handle 6 adjacent the end of shank 9 and extend in converging relation into engagement with bar 15 intermediate its ends and at circumferentially spaced points thereon as shown in Fig. 3. These legs, where they engage the bar, not only form a stop and fulcrum point 20 for the rocking of handle 6, but form a guide for centering the handle as the legs move along the bar.

Figure 2:
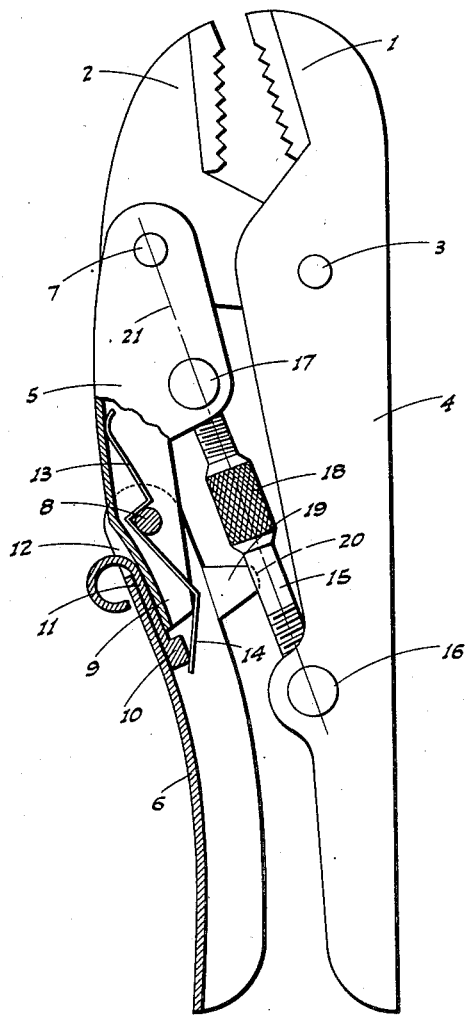
Figure 2 is a similar view, showing the position of the sectional-handle release after it has been actuated to unlock the jaws.

In operation, after initial engagement of the work between the jaws following proper adjustment of the toggle bar 15, and with handle sections 5 and 6 held rigid by block 10, squeezing together of the handles will cause the upper toggle bar engaging pin 17 to pass beyond the dead center line 21, as shown in Fig. 1 locking the jaws against release. To release the jaws, it is only necessary to slide the block 10 down so that it clears shank 9, as shown in Fig. 2. A squeeze on handle 6 then causes the same to rock about fulcrum 20, shifting pivot 8 out and thus swinging handle section 5 out so that the upper toggle bar engaging pin 17 is shifted to a position ahead of the dead center line 21, releasing the jaws from the work.

Having thus described the invention, the following is claimed as new and useful and upon which Letters Patent are desired:

1. In a locking plier-type wrench having longitudinal jaw-control handles arranged for relative approaching and separating movement, one handle being sectional and comprising a forward section pivoted on the corresponding jaw and a rearward grip section pivoted on the forward sections, means between the handle sections preventing relative outward swing of the grip section beyond a predetermined position, and a releasable over dead-center locking bar extending diagonally between and pivotally connected to the other handle intermediate its ends and to said forward handle section intermediate its ends; a lock release means comprising a manually operable member mounted on the sectional handle and acting to normally maintain the handle sections rigid with each other and preventing swinging movement of the grip section relative to the forward section in the direction of the other handle but releasable to allow of such movement, and an element on and rigid with the grip section intermediate its ends for engagement with the locking bar intermediate its ends in fulcruming relation upon such swinging movement being imparted to the grip section whereby to cause the forward handle section to be swung in the opposite direction to reverse the dead-center position of the bar and break the lock.

2. A wrench, as in claim 1, in which the grip section of said one handle is channel shaped in facing relation to the other handle, and the forward section includes a shank projecting into the channel of said grip section past the pivot thereof and spaced from the bottom of the channel; said member comprising a block slidably disposed in the channel and movable from a close-fitting position between the shank and the bottom of the channel to a position rearwardly of and clear of the shank.

3. A wrench, as in claim 2, with a finger element connected to the block and projecting through a longitudinal opening in the bottom of the channel.

4. A wrench, as claim 2, with an enclosed leaf spring acting on the handle sections on opposite sides of their connecting pivot to yieldably resist relative swinging thereof and also acting on the block to yieldably maintain the same in said close fitting position.

5. A wrench, as in claim 1, in which the grip section of said one handle is channel shaped in facing relation to the other handle and the locking bar includes a cylindrical portion and said fulcrum forming element comprises legs extending from the sides of the channel in converging relation to ride on the cylindrical portion of the bar at circumferentially spaced points thereon.

LAWRENCE C. MEAD.

REFERENCES CITED

The following references are of record in the file of this patent:

UNITED STATES PATENTS

| Number | Name | Date |
| --- | --- | --- |
| 1,086,078 | Palmer | Feb. 3, 1914 |
| 1,568,934 | Tull | Jan. 5, 1926 |
| 2,201,918 | Petersen | May 21, 1940 |
| 2,284,003 | Luppert | May 26, 1942 |
| 2,327,368 | Olson | Aug. 24, 1943 |
| 2,443,153 | Wells | June 8, 1948 |
| 2,462,709 | Ball | Feb. 22, 1949 |
| 2,489,895 | Kash | Nov. 29, 1949 |